United States Patent

Landrum

[15] 3,703,947

[45] Nov. 28, 1972

[54] INTERNAL PIPELINE COATING APPARATUS

[72] Inventor: Ira T. Landrum, Hobbs, N. Mex.

[73] Assignee: Internal Pipeline Services, Inc., Tulsa, Okla.

[22] Filed: March 8, 1971

[21] Appl. No.: 121,802

[52] U.S. Cl. .................................. 188/290, 118/408
[51] Int. Cl. ............................................. F16d 57/00
[58] Field of Search ...... 118/306, 408; 188/279, 290; 104/138 R

[56] References Cited

UNITED STATES PATENTS

| | | | |
|---|---|---|---|
| 2,730,200 | 1/1956 | Murphy | 188/290 |
| 2,905,276 | 9/1959 | Henderson et al. | 188/290 |
| 3,058,137 | 10/1962 | Doyle et al. | 118/408 X |
| 3,103,260 | 9/1963 | Gaines et al. | 188/290 X |
| 3,495,546 | 2/1970 | Brown et al. | 118/408 X |

*Primary Examiner*—Duane A. Reger
*Attorney*—John A. Mawhinney

[57] ABSTRACT

A slug assembly for passage through a pipeline and to be controllably propelled through the pipeline as a sliding restrictive fluid by-pass piston therein in response to fluid being pumped through the pipeline. The slug assembly includes (1) pipeline interior surface engaging wheeled brake structure for controllably braking the speed of travel of the slug assembly through the pipeline, (2) storage tanks for treating liquids to be applied to the interior walls of the pipeline, (3) a wall friction driven pump assembly for pumping liquids from the tanks through a discharge line, (4) a wall friction driven liquid metering assembly for controllably metering the flow of liquid through the discharge line, and (5) a controlled fluid by-pass sliding piston assembly for developing a travel thrust on the slug assembly for movement of the latter through the pipeline in response to a differential between fluid pressures within the pipeline on opposite sides of the piston assembly, the fluid by-pass portion of the piston assembly incorporating a fluid turbine structure driving a trailing rotary spray head to which the liquid discharge from the liquid metering assembly is supplied.

9 Claims, 18 Drawing Figures

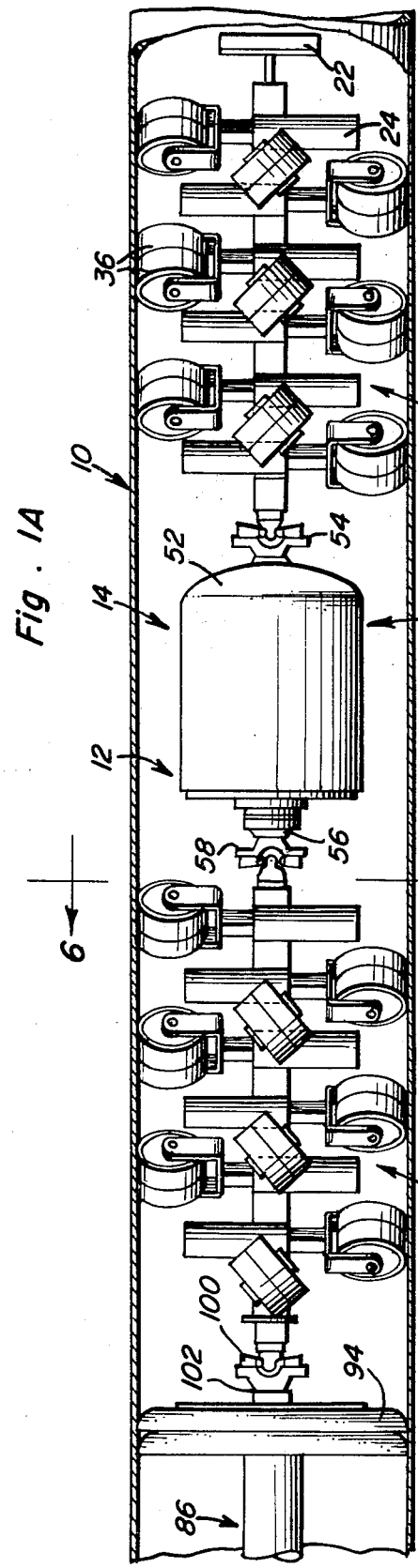
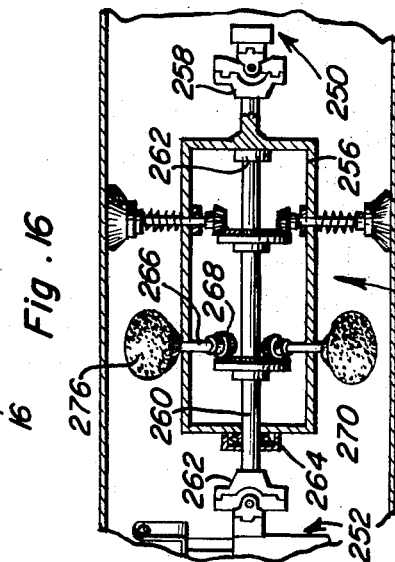
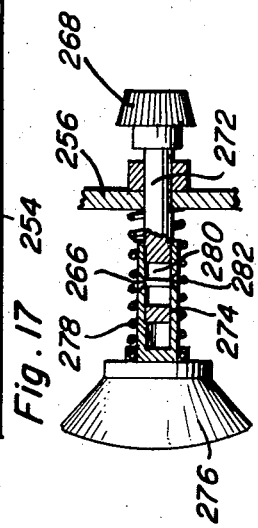
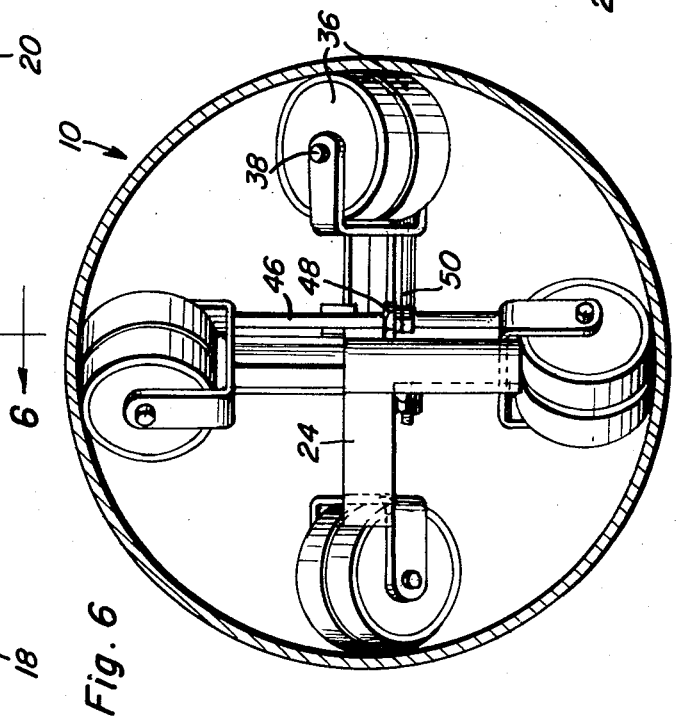
PATENTED NOV 28 1972
3,703,947
SHEET 1 OF 5
INVENTOR
Ira T. Landrum
BY John A. Mackinny
ATTORNEY

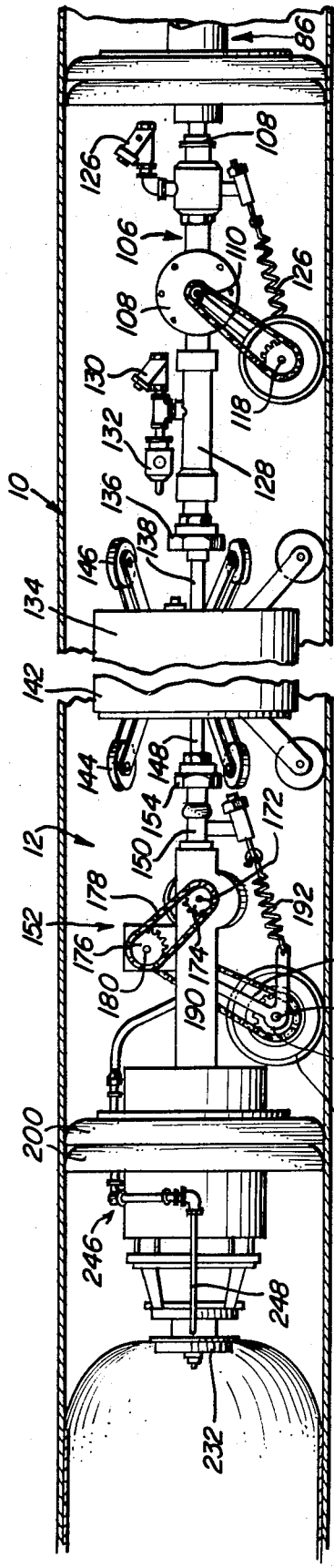
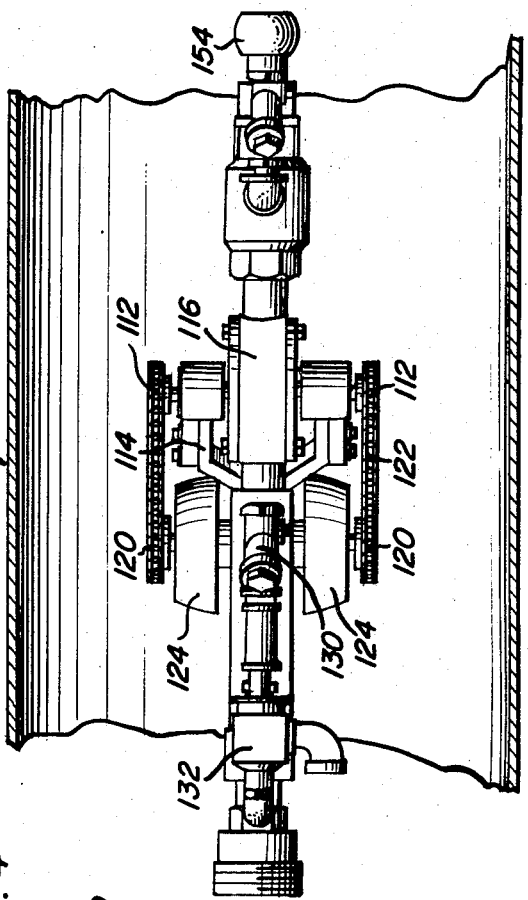
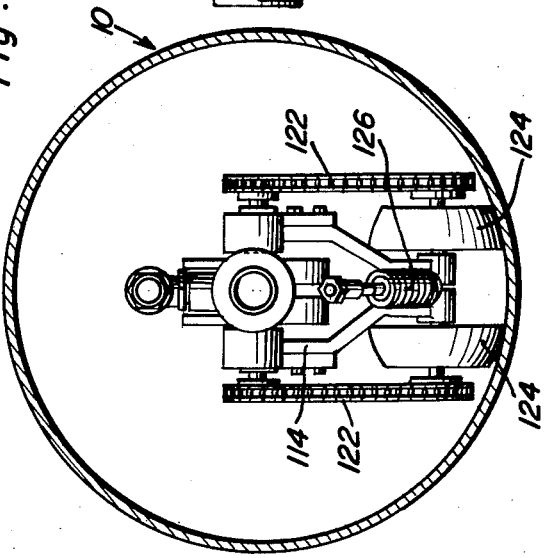

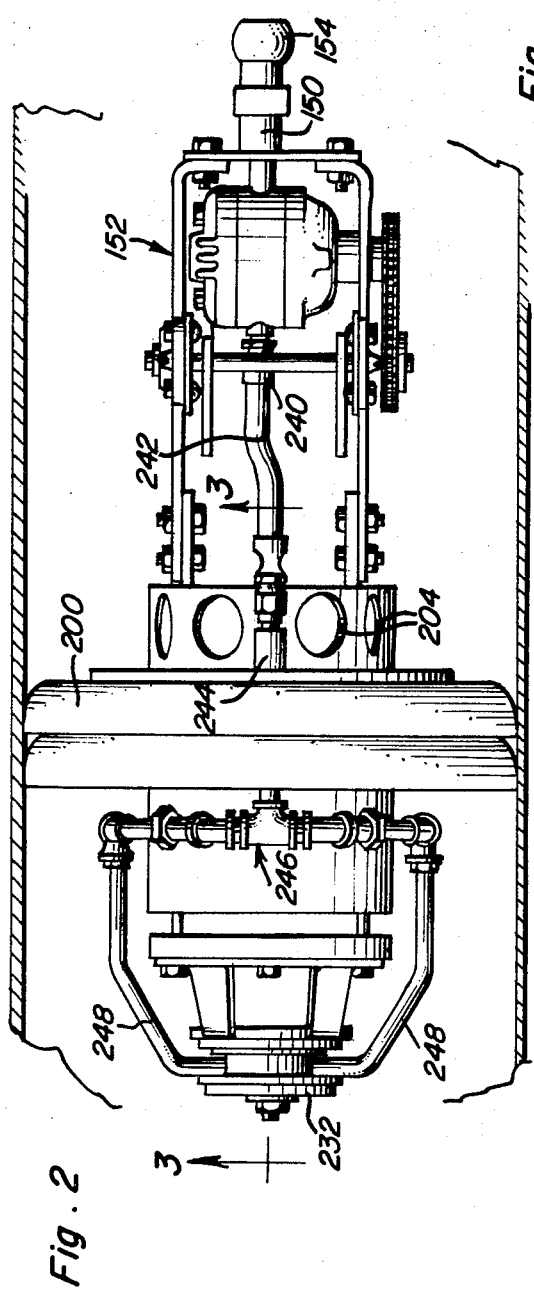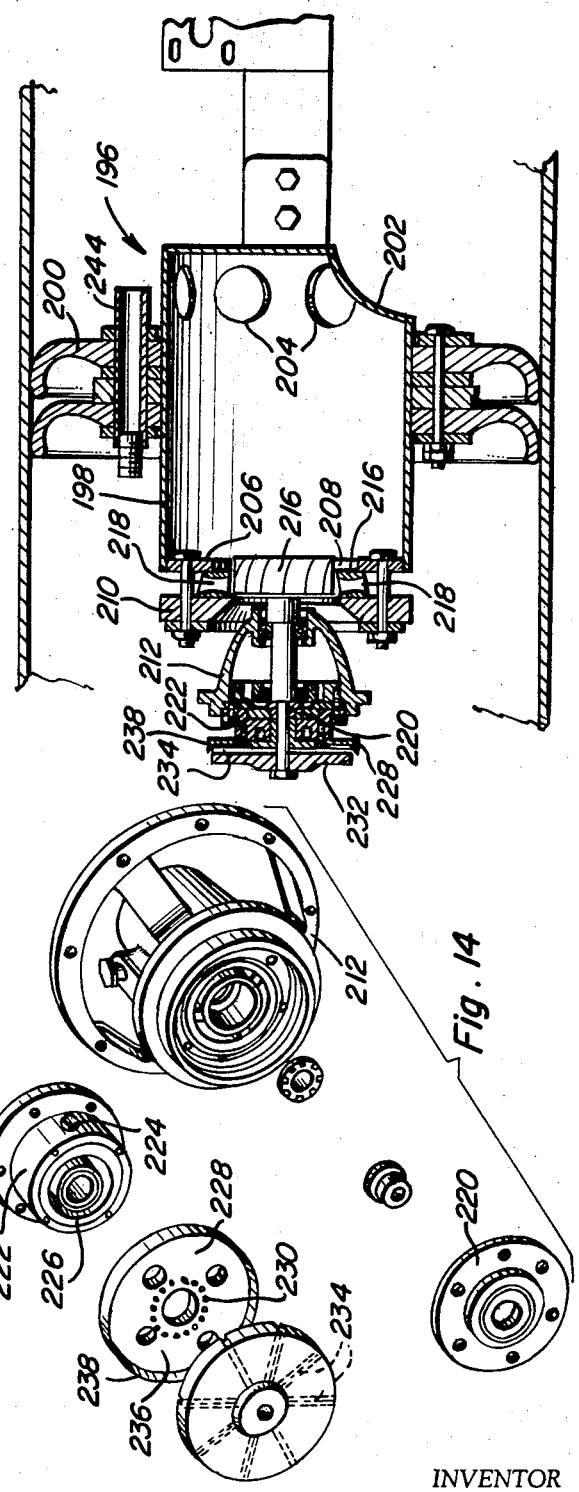

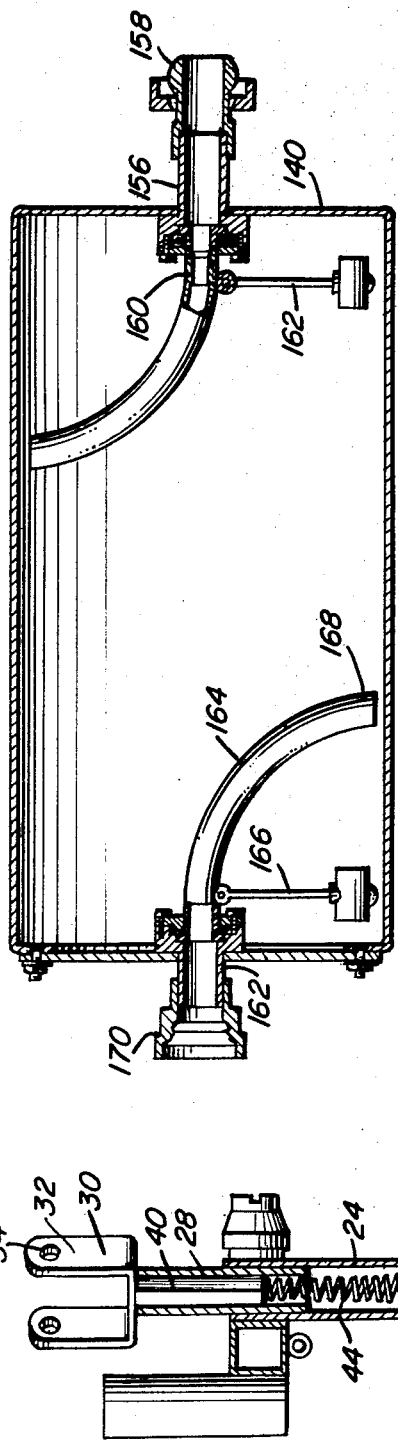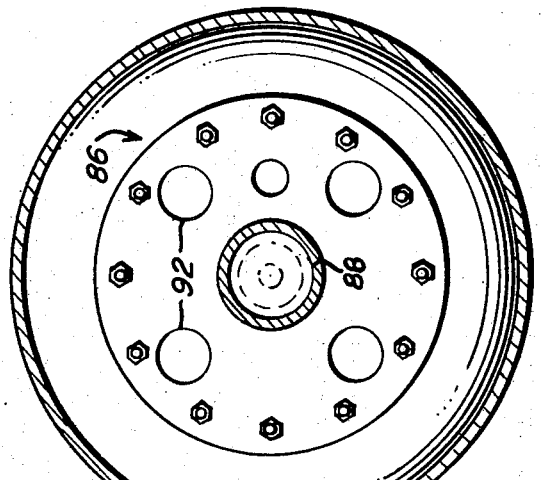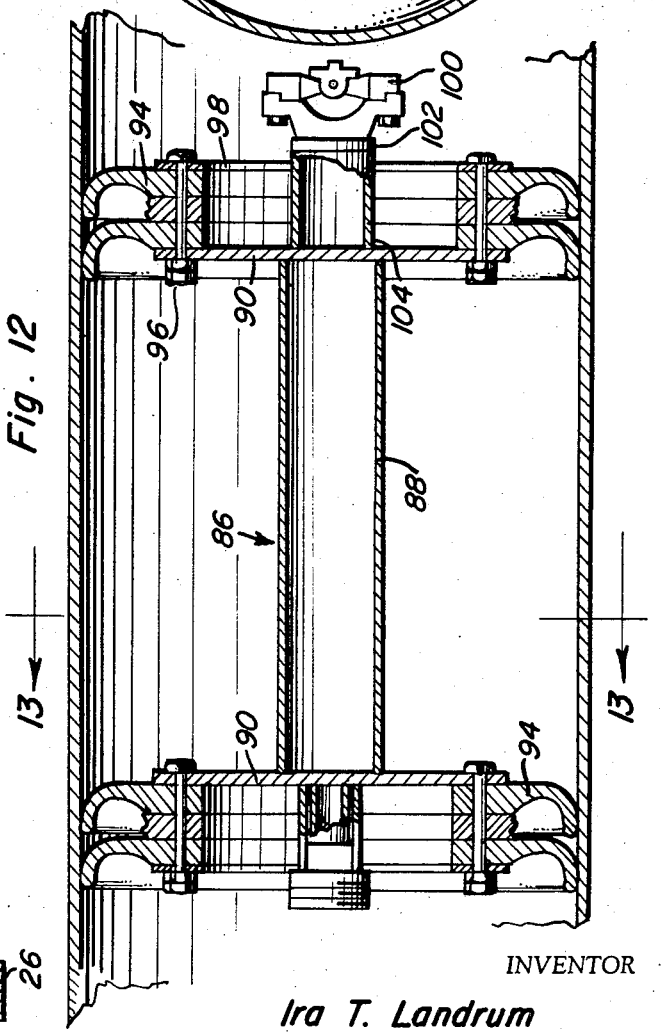

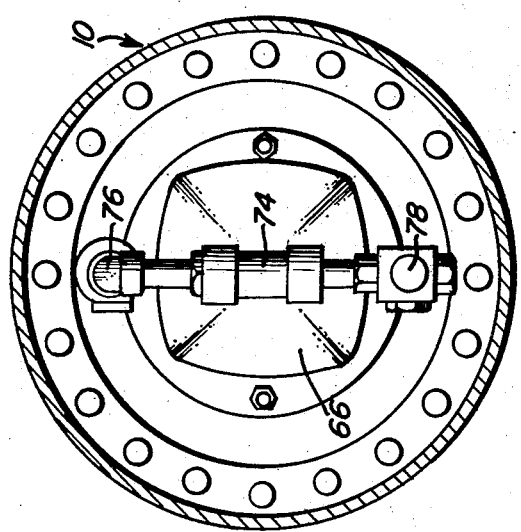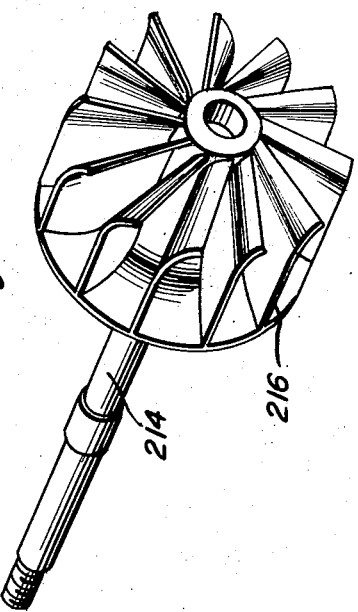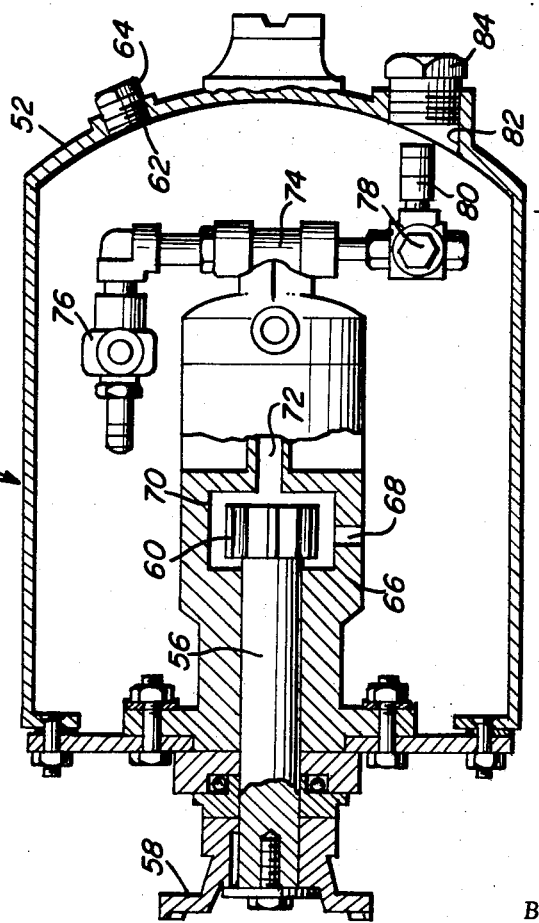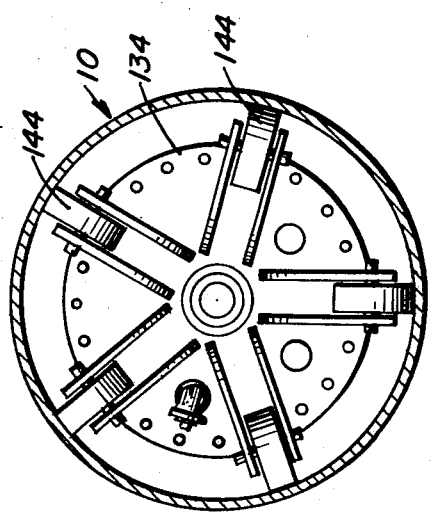

INTERNAL PIPELINE COATING APPARATUS

This invention comprises an improvement over the apparatus disclosed in my prior U.S. Pat. No. 3,106,735, dated Oct. 15, 1963.

This apparatus is a device for mechanically controlling the input of fluid energy to a dynamic system, or, in the converse, converting fluid energy to mechanical energy.

In the first instance, this apparatus may be used to control the speed of any device which may be propelled through a closed conduit or pipeline by fluid pressure. This device consists of four parts or a multiplicity of such parts arranged in such a manner that an increase in the speed of this device automatically increases the requirement for the force to drive it. It is thus a dynamic brake whose function is to regulate the speed of any device or apparatus to which it may be attached. The complete apparatus includes a forward or leading wheeled brake assembly for controlling the rate of speed at which the entire slug assembly may be propelled through an associated pipeline by a differential between fluid pressures ahead of and behind the slug assembly. The brake assembly is followed by a stabilizing assembly and a trailing air pump including a drive wheel for rolling engagement with the internal surfaces of the associated pipeline and the discharge of the air pump is successively applied to the interiors of liquid tanks over the liquid levels therein for discharging the liquid within the tanks from the rear most tank which is in turn trailed by a metering pump driven by a friction wheel in rolling contact with the internal surfaces of the associated pipeline and thereby operably to meter the flow of liquid therethrough in accordance with the speed of the slug assembly through the pipeline. The metering pump is trailed by a piston assembly in sliding contact with the walls of the associated pipeline for driving the slug assembly through the pipeline in response to a differential in pressures ahead and behind the piston assembly. The discharge from the metering pump is piped through the piston assembly which also includes a restrictive by-pass passage for fluids flowing through the pipeline. The by-pass passage has a turbine wheel operatively associated therewith whereby the by-pass fluids function to drive the turbine wheel and the turbine wheel is drivingly connected to a rotary spray head disposed to the rear of the piston assembly to which the metered liquids from the metering pump are directed.

The brake assembly includes spaced leading and trailing wheel assemblies between which a hydraulic pump having a closed fluid circuit and a restricted discharge is disposed. The leading wheel assembly is coupled to the pump housing for rotation therewith about the center line of the associated pipeline and the trailing wheel structure is coupled to the rotor of the pump for rotation of the rotor with the trailing wheel assembly. The leading and trailing wheel assemblies include oppositely canted friction wheels or rollers rollingly engagable with the internal surfaces of an associated pipeline, whereby movement of the entire slug assembly through an associated pipeline will cause rotation of the leading and trailing wheel assemblies in opposite directions about the longitudinal axis of the pipeline and thus relative rotation of the pump housing and rotor. Of course, with a restricted discharge provided on the hydraulic pump in its closed hydraulic circuit, the tendency of the housing and rotor portions of the pump and thus the leading and trailing wheel assemblies to rotate in opposite directions at excessive speeds relative to each other is resisted and the braking action resulting overcomes any tendency of the entire slug assembly being advanced through the associated pipeline at an excessive speed as a result of the differential in pressures ahead and behind the piston assembly.

The main object of this invention is to provide an apparatus for movement through an associated pipeline by fluid pressures of a fluid being pumped through the pipeline and with the rate of movement of the pipeline treating apparatus or slug assembly being controlled by novel brake means preventing excessive speed of the slug assembly through the associated pipeline.

Another object of this invention is to provide a pipeline treating apparatus capable of movement through a pipeline, carrying a considerable volume of treating liquid for coating the interior surface of the pipeline, maintaining a discharge pressure on the treating liquids, metering the pressurized liquid in accordance to the rate of movement of the pipeline treating apparatus through an associated pipeline, and spraying the metered treating liquid radially outwardly from a center point within the pipeline for coating the internal surfaces of the pipeline as the treating apparatus moves through the pipeline.

Another very important object of this invention is to provide a pipeline slug assembly for movement through as associated pipeline as a piston is forced through a cylinder by greater pressures acting upon the piston on one side thereof and including novel means for developing rotational torque as a result of movement of the slug assembly through the pipeline, which rotational torque may be utilized to drive any attendant power requiring mechanism.

Yet another object of this invention is to provide train of storage tanks for liquid and to be move through a pipeline with the tanks constructed in manner and communicated with each other as to en ble air or gas pressure applied to the upper portion one of the end tanks to be operative to successive pump the liquid from each successive tank toward t other end tank for discharge therefrom.

A final object of this invention to be specifically er merated herein is to provide an internal pipeline cc ing apparatus in accordance with the preceding obje which will conform to conventional forms of manu ture, be of simple construction and easy to use so a provide a device that will be economically usable, ! lasting and relatively trouble free in operation.

These together with other objects and advant which will become subsequently apparent reside i1 details of construction and operation as more hereinafter described and claimed, reference bein; to the accompanying drawing forming a part he wherein like numerals refer to like parts throu£ and in which:

FIG. 1A is a side elevational view of the fror portion of the apparatus of the instant invent disposed within a pipeline;

FIG. 1B is a fragmentary side elevational view center and rear portions of the apparatus as disp a pipeline;

FIG. 2 is a top plan view of the rear end portion of the apparatus;

FIG. 3 is a fragmentary vertical sectional view taken substantially upon the plane and indicated by the section line 3—3 of FIG. 2;

FIG. 4 is a front elevational view of the air pump portion of the apparatus disposed within a pipeline section with the pipeline section illustrated in vertical section;

FIG. 5 is a top plan view of the air pump with the associated pipeline illustrated in horizontal section;

FIG. 6 is a enlarged transversed vertical section view taken substantially upon the plane indicated by the section lines 6—6 FIG. 1A;

FIG. 7 is a fragmentary elevational view of one end portion of one of the wheel assemblies comprising one of the drive components of the brake assembly with portion thereof being broken away and illustrated in vertical section and the associated friction wheels removed;

FIG. 8 is an enlarged vertical sectional view of the hydraulic pump portion of the brake assembly taken substantially upon a plane passing along the longitudinal center line of the pump assembly;

FIG. 9 is a transverse vertical sectional view taken substantially upon the plane indicated by the sectional line 9—9 of FIG. 8;

FIG. 10 is an end elevational view of one of the liquid tanks of the pipeline coating apparatus as disposed within the pipeline section and with the pipeline section illustrated in vertical section;

FIG. 11 is a longitudinal vertical sectional view taken substantially upon the plane passing through the center of one of the liquid tanks;

FIG. 12 is an enlarged longitudinal sectional view of the stabilizing assembly of the pipeline coating apparatus taken substantially upon a plane passing through the longitudinal center line thereof;

FIG. 13 is a transverse vertical sectional view taken substantially upon the plane indicated by the sectional line 13—13 of FIG. 12;

FIG. 14 is an exploded perspective view of the rotary spray head portion of the pipeline coating apparatus;

FIG. 15 is a perspective view of the turbine wheel for driving the rotary spray head;

FIG. 16 is a longitudinal vertical sectional view of a rotary brush cleaning unit which may be disposed ahead of the brake assembly of the pipeline coating apparatus and driven by means of wheel assemblies similar to those utilized to drive the brake assembly;

FIG. 17 is an enlarged fragmentary sectional view of one of the rotary brushes utilized on the brush cleaning unit illustrated in FIG. 16.

Referring now more specifically to the drawings the numeral 10 generally designates a pipeline and the numeral 12 generally designates the internal pipeline coating apparatus of the instant invention, see FIGS. 1A and 1B.

With attention now invited more specifically to FIG. 1, the apparatus may be seen to include a brake assembly referred to in general by the reference numeral 14. The brake assembly 14 includes a front or leading wheel assembly referred to in general by the reference numeral 16 and a trailing or rear wheel assembly referred to in general by the reference 18 with a hydraulic pump referred to in general by the reference numeral 20 disposed between the wheel assembly 16 and 18. The forward end of the wheel assembly 16 includes a padded abuttment head 22 and each of the wheel assemblies 16 and 18 includes a plurality of longitudinally and circumferentially spaced generally radially extending sleeves 24. The outer ends of the sleeves 24 are closed as at 26 and the radial innermost ends of the sleeves 26 have support tubes 28 telescopingly disposed therein. The support tubes 28 project outwardly of the open ends of the sleeves 24 and the support bifurcated yokes 30 therefrom whose furcations 32 are apertured as at 34 and have a pair of rubber tired wheels or rollers 36 journalled therebetween by means of an axle pin 38 pass through the apertures 34. The yokes include shank portions 40 telescoped within the support tubes 28 and a compression spring 44 is seated in each sleeve 24 and abuts the inner end of the corresponding shank or shank portion 40. In addition, each yoke includes a limit rod 46 secured thereto and secured through a corresponding stationary guide 48 by means of lock nuts 50. Accordingly, it may be seen that the yokes and the rubber tired rollers 36 supported therefrom are urged radially outwardly of circumferentially and longitudinally spaced portions of each of the wheel assemblies 16. It will be noted from FIG. 1A that the rollers 36 of the wheel assembly 16 are canted oppositely relative to the manner in which the rollers 36 of the wheel assembly 18 are canted. Thus, as the roller assemblies 16 and 18 are advanced longitudinally through the pipeline 10 in the same direction, the wheel assemblies 16 and 18 rotate in opposite directions about the longitudinal axis of the pipeline due to the rolling frictional engagement of the tires or rollers 36 with the internal surfaces of the pipeline 10. The rear end of the wheel assembly 16 is coupled to the forward end of the housing 52 of the hydraulic pump 20 by means of a universal joint 54 and the forward end of the wheel assembly 18 is coupled to the rotor shaft 56 of the hydraulic pump by means of a universal joint 58.

With attention now invited more specifically to FIG. 8 of the drawings, it may be seen that the hydraulic pump 20 includes an impeller or rotor 60 mounted on the inner end of its rotor shaft 56 and that the interior of the housing 52 defines a hydraulic fluid reservoir including a fill and drain opening 62 closed by means of a removable plug 64. The stationary portion 66 of the pump 20 includes an inlet passage 68 leading from the interior of the housing 52 exteriorly of the stationary portion 66 to the interior of the impeller cavity or chamber 70 within the stationary portion 66. Also, it will be noted that the stationary portion 66 includes an outlet 72 which opens outwardly thereof through a T-fitting 74 having a relief valve 76 operatively associated with one outlet thereof and an adjustable control valve 78 operatively associated with the other outlet of the T-fitting 74. Of course, the outlet control valve functions to discharge the fluid pumped by the pump 20 back into the interior of the housing 52 to be again drawn in through the inlet 68 and thus the hydraulic pump 20 has a closed circuit. The discharge control valve 78 includes a regulator portion 80 to which access may be It may thus be seen that the brake assembly defined by the wheel assemblies 16 and 18 and the hydraulic pump 20 is operative to control the movement of the apparatus 12 through the pipeline 10 by the controlled discharge of the pump 20 retarding relative rotation of the wheel assemblies 16 and 18 and thus movement of the apparatus 12 through the pipeline 10.

With attention now invited more specifically to FIGS. 1A and 12 of the drawings, it may be seen that a stabilizing assembly referred to in general by the reference numeral 86 is disposed immediately behind the trailing wheel assembly 18. The stabilizing assembly 86 includes a center axial tubular body 88 having mounting end plates 90 secured thereto. The end plates 90 are circumferentially apertured as at 92 and each plate 90 has three sealing rings 94 secured thereto by means of a plurality of fasteners 96 and a retaining ring 98.

The sealing rings 94 are constructed of resilient material and their outer peripheral portions guidingly engage the inner surface portions of the pipeline 10. The rear end of the rear or trailing wheel assembly is connected to the forward end of the stabilizing assembly 86 by means of a universal joint 100 and a thrust bearing 102 supported from a tubular mount 104 projecting endwise outwardly from the forward end of the front end of plate 90. The rear end of the stabilizing assembly 86 is coupled to the front end of an elongated air pump assembly referred to in general by the reference numeral 106 by means of a ball joint 108, see FIGS. 1B and 12.

The air pump assembly 106 includes an air pump 108 having a rotary input shaft 110 on whose opposite exposed ends a pair of sprocket wheels 112 are mounted. The bifurcated end of a support leg 114, see FIG. 5 is journalled from the end portions of the shaft 110 inwardly of the sprocket wheel 112 and outwardly of the opposite side walls of the air pump casing 116. The support leg or arm 114 extends rearwardly and downwardly from the casing 116 and has an axial member 118 journalled through its free end. A pair of sprocket wheels 120 aligned with the sprocket 112 are mounted on the opposite ends of the axial or axial shaft 118 for rotation therewith and endless chains 122 are trained to back corresponding sprocket wheels 112 and 120. The opposite end portions of the axial shaft 118 have friction wheels 124 mounted thereon and an expansion spring 126 is provided to yieldingly maintain the friction wheels 124 in tight rolling frictional engagement with the internal surfaces of the pipeline 10.

The air pump assembly 106 includes an air inlet check valve 126 and a rear outlet pipe 128 with which a check valve 130 and a relief valve 132 are operatively associated. The rear end of the outlet pipe 128 is coupled to the front end of a leading liquid supply tank 134 by means of a tubular ball joint coupling 136 supported on the forward inlet end of an inlet pipe 138 opening through the forward wall of the tank 134.

With attention now invited more specifically to FIG. 1B as well as FIG. 11, it is pointed out that a plurality of tanks are provided in end aligned relation. The forward tank 134 is followed by one or more intermediate tanks 140 such as that illustrated in FIG. 11 and a final rear tank 142 such as that illustrated in FIG. 1B. The rear end of each tank 134, 140 and 142 includes supporting rollers 144 disposed rearward thereof and circumferentially thereabout for rolling engagement with the internal surfaces of the pipeline 10. In addition, the forward tank 134 includes forwardly displaced and circumferentially spaced similar supporting rollers 146. The rear end of the rear tank 142 includes an outlet pipe 148 opening endwise outwardly of the rear wall of the tank 142 and the discharge end of the outlet pipe 148 is coupled to the inlet neck 150 of a metering pump assembly referred to general by the reference numeral 152, see FIG. 1B. In addition, the tank 134 as well as the intermediate tanks 140 each also include an outlet pipe corresponding to the outlet pipe 148 which is coupled to the inlet neck 150 by means of a hollow ball joint coupling 154 and the front end of each intermediate tank 140 and the rear tank 142 includes an inlet pipe 156 corresponding to the inlet pipe 138 whose forward inlet end is coupled to the next forward outlet pipe by means of a hollow ball joint coupling 158.

With attention now invited more specifically to FIG. 11 of the drawings, it may be seen that the discharge end of each inlet pipe opens through the corresponding front wall of the associated tank and has a curved liquid and air inlet tube 160 rotatably supported therefrom. Each liquid and air inlet tube is gravity weighted as at 162 so that the outlet end of each inlet tube 160 opens into the corresponding tank closely adjacent the uppermost portion of the interior thereof. On the other hand, each outlet pipe of the tanks 134, 140 and 142 such as the outlet pipe 162 of the tank 140 includes a curved pick up tube 164 journalled from its inlet end disposed within the corresponding tank. Each pick up tube 164 is gravity weighted as at 166 so that the inlet end 168 of the pick up tube opens into the corresponding tank in the lower most portion of the interior thereof. Further, the outlet pipe of the tank 34 and each of the intermediate tanks 140 is coupled to the inlet pipe of the tank disposed there behind by means of a hollow ball joint coupling 170.

The metering pump 152 includes a rotary input shaft 172 upon which a sprocket wheel 174 is mounted and the sprocket wheel 174 is driven from a shaft mounted sprocket wheel 176 drivingly coupled thereto by means of an endless flexible chain 178. The sprocket wheel 176 is mounted on a rotatable shaft 180 journalled from the metering pump 152 and the shaft 180 has a sprocket wheel (not shown) mounted on the end thereof remote from the sprocket sheel 176 driven by a sprocket wheel 182 drivingly coupled thereto by means of an endless chain 184 and supported on an axial 186 having a friction drive wheel 188 also mounted thereon. The axial 186 is journalled from a support leg 190 oscillatedly supported from the mounting pump 152 and an expansion spring 192 similar to the expansion spring 126 is provided to maintain the friction drive wheel 188 in tight rolling frictional engagement with the inter surfaces of the pipeline 10.

With attention now invited more specifically to the FIGS. 2, 3 and 14 of the drawings, it may be seen that the rear end of the metering pump 152 is supported from the forward of a piston assembly referred to in general by the reference numeral 196. The piston assembly includes a large diameter tubular body 198 about which three sealing rings 200 similar to the sealing rings 94 are secured. The tubular body is open at its forward end forwardly of the sealing rings 200 as at 202 and 204 and the rear end of the tubular body 198 includes a rear wall 206 having a central aperture or opening 208 formed therein. A mounting plate 210 is supported in slightly spaced relation behind the rear wall 106 and has an impeller housing 212 supported therefrom. The impeller housing rotatably jerrales an impeller shaft 214 therethrough and an impeller wheel of the radially intake and axial discharge type is mounted on the forward end of the shaft 214 and designated by the reference numeral 216. A defuser section 216 is mounted between the mounting plate 210 and the rear wall 206 and defines gas or air inlets 218 for the impeller wheel 216. Also, a seal plate 220 is secured over the rear end of the impeller housing 212 and a fluid distributor plate 222 is mounted behind the seal plate 220. The fluid distributor plate 222 includes a pair of diametrically opposite inlet ports 224 which open into an angularly rearwardly opening liquid chamber 226 and a retainer flange 228 is secured on behind the fluid distributor plate 222 closing up the angular liquid cavity except for a plurality of liquid passages 230 formed therethrough at points spaced circumferentially thereabout and registered with the liquid chamber 226. Finally, a rotary plate 232 having a radially grooves 234 formed in its front face is secured on the rear end of the impeller shaft 214 behind the retainer flange or fan pattern nozel 228. The rear face of the fan pattern nozzel is recessed as at 236 with the outer circumferential edge of the recess 236 having a 30 degree chamfer as at 238.

With attention invited more specifically to FIGS. 2 and 3 of the drawings it will be seen that the metering pump 152 includes an outlet 240 and that a flexible hose 242 couples the outlet 240 with the inlet end of a through pipe 244 sealingly secured through the piston assembly 196 outwardly of the tubular body 198.

A manifold assembly generally referred to by the reference numeral 246 is coupled to the outlet end of the through pipe 244 and includes a branch lines 248 whose discharge ends are secured in the inlet ports 224.

In operation, the apparatus 12 is disposed within the pipeline 10 with the tanks 134, 140 and 142 filled or substantially filled with liquid to be sprayed upon the internal surfaces of the pipeline 10. Then, air or gas is pumped through the pipeline 10 from the left hand end thereof to the right hand end thereof as viewed in FIGS. 1A and 1B.

Some of the air or gas pumped through the pipeline 10 by passes the piston assembly 196 by passing through the impeller wheel 216 but in doing so the impeller wheel 216 is rotated at high speed.

Nevertheless, the pressure acting upon the rearwardly facing surfaces of the piston assembly 196 is greater than the pressure within the pipeline 10 disposed forward of the piston assembly 196 and accordingly, the entire apparatus 12 is pushed along the pipeline 10 from the left to the right as viewed in FIGS. 1A and 1B. As the apparatus 12 moves through the pipeline 10, the wheel assemblies 16 and 18 are rotated in opposite directions thus causing relative rotation of housing 52 and rotor or impeller 60 of the hydraulic pump 20. Of course, the discharge of the hydraulic pump 20 is restricted by the controlled discharge valve 78 adjusted through the access opening 82 and thus it is much as relative rotation of the wheel assemblies 16 and 18 is restricted forward movement of the assembly 12 through the pipeline 10 is restricted, the hydraulic pump 20 and the wheel assemblies 16 and 18 thereby acting as a brake.

The stabilizing assembly 86 serves to stabilize the apparatus 12 immediately behind the wheel assembly by the sliding contact of the rings 94 of the stabilizing assembly 86 with the internal surfaces of the pipeline 10.

Forward movement of the apparatus 12 causes the drive wheels or friction wheels 124 of the air or gas pump 108 to rotate and thus a portion of the air or gas that bypasses the piston assembly 196 is taken into the air pump 108 and pumped outwardly therefrom through the outlet pipe 128 and into the inlet pipe 138 of the forward tank 134. This air is discharged within the tank 134 above the liquid level therein and accordingly, liquid from the tank 134 is pumped outwardly therefrom through its pickup tube 164 and into the leading intermediate tank 140 through the inlet pipe 156 thereof. The passage of liquid and air or gas through the tanks 134, 140 and 142 continues whereby successive rearward tanks have the liquid therein expelled therefrom and the liquid discharged through the outlet pipe 148 of the rear pipe 142 is delivered to the inlet neck 150 of the metering pump 152 whose drive wheel 188 turns the input shaft 172 of the metering pump 152 and thereby meters the flow of liquid from the tanks 134, 140 and 142 through the metering pump 152 according to the speed of movement of the apparatus 12 through the pipeline 10. The liquid passing through the metering pump is then discharged rearwardly through the piston assembly 196 via the through pipe 244 and conveyed to the inlet ports 224. The liquid is then discharged rearwardly from the liquid chamber 226 through the ports or apertures 230 and is spun radially outwardly at great speed by the grooves 234 in the front face of the rotary plate 232. However, as the liquid is discharged from the outer ends of the grooves 234 within the recess 236 formed in the rear face of the fan pattern nozzle 228, the liquid strikes the chambered periphery 238 of the recess 236 and is directed slightly rearwardly to counteract the flow of air or gas passed the fan pattern rotor 232 and through the turbine wheel 216. Thus, liquid from within the tanks 234, 240 and 242 maybe evenly sprayed upon the internal surfaces of the pipeline 10 at a rate proportional to the speed of the apparatus 12 through the pipeline, which speed is governed by the brake assembly comprising the wheel assembly 16 and 18 and the hydraulic pump 20.

With attention now invited more specifically to FIGS. 16 and 17 of the drawings, in the event it is desired to clean the internal surfaces of the pipeline 10 a head of the apparatus 12, a pair of wheel assemblies 250 and 252 may be disposed forward of the assembly 12 with the rear end of the wheel assembly 252 coupled to the front end of the wheel assembly 16 by means of a universal joint and thrust bearing (not shown) in lieu of the abuttment head 22. Then, a rotary brush cleaning unit referred to in general by the reference numeral 254 may be disposed between the wheel assemblies 250 and 252 with the hollow cylindrical housing 256 of the unit 254 having its forward end coupled to the wheel assembly 250 by means of a universal joint 258. In addition, a center longitudinal shaft 260 is journalled within the housing 256 by means of a forward bearing 262 and a rear bearing 264 and the rear end of the shaft 260 is coupled to the front end of the wheel assembly 252 by means of a universal joint 262.

A plurality of rotary brush shanks 266 are journalled through the housing side walls 256 at points spaced longitudinally therealong and circumferentially thereabout substantially along radii of the housing 256 and the inner end of each shank portion 266 includes a bevel gear 268 meshed with a corresponding ring gear 270 carried by and mounted upon the shaft 260 for rotation therewith. Each of the shank portions 266 includes a first section 272 thereof upon which the corresponding bevel gear 268 is mounted and a second section telescopingly engaged over the end of the section 272 remote from the bevel gear 268 with the end of the second section 274 remote from the corresponding bevel gear 268 provided with a brush head 276 and a compression spring 278 disposed about the shank portion 266 with one end bearing on the outer surface of the housing 256 and the other end bearing on the brush head 276. In this manner, the compression springs 278 serve to yieldly bypass the rotary brush heads 276 into frictional engagement with the internal surfaces of the pipeline 10 and relative rotation between the wheel assemblies 250 and 252 causes the shank portions 266 to rotate at a speed considerably higher than the rotational speed of the shaft 260 relative to the housing 256. As may best be seen from FIG. 17, the end of the section 272 disposed within the section 274 has a longitudinally extending diametric slot 280 formed therein and a crossbar 282 carried by the section 274 is slidably disposed within the slot 280. Accordingly, axial shifting of the section 274 relative to the section 272 is limited.

It is also pointed out that there is wheel assemblies such as the wheel assemblies 250 and 252 and the wheel assemblies 16 and 18 may be utilized to cause relative rotation between other relatively rotatable components as the case and armature of a generator whereby a source of electrical potential may be had during movement of the apparatus 12 through the pipeline 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A slug assembly for passage through a pipeline, said slug assembly including oppositely canted wheel assemblies for rolling contact with the interior surfaces of a pipeline and for rotation in opposite directions relative to each other in response to movement through the pipeline in the same direction, said slug assembly further including brake means including two relatively rotatable components to which said wheel assemblies are drivingly connected, said brake means including means for controllably braking said components relative to each other.

2. A slug assembly for passage through a pipeline, said slug assembly including oppositely canted wheel assemblies for rolling contact with the interior surfaces of a pipeline and rotation in opposite directions relative to each other in response to movement through the pipeline in the same direction, said slug assembly further including a pair of first and second members rotatable relative to each other about an axis generally coinciding with the axis of rotation of said wheel assemblies when the latter are axially advanced in the same direction through a pipeline, said wheel assemblies being drivingly connected to said first and second members.

3. The combination of claim 2, wherein said first and second members comprise the housing and input shaft portions of a hydraulic pump.

4. The combination of claim 3, wherein said hydraulic pump is incorporated in a closed hydraulic circuit and said pump includes a variouable restricted discharge control valve.

5. The combination of claim 1 wherein said wheel assemblies each includes a plurality of circumferentially and longitudinally spaced wheel components disposed radially outwardly of a center axis extending between said wheel assemblies and about which said wheel assemblies are relatively rotatable.

6. The combination of claim 5, wherein said wheel components of each of said wheel assemblies are supported therefrom for generally radial shifting relative to said center axis between inner and outer limit positions, and means yieldly biasing said wheel components toward said outer positions.

7. The combination of claim 1 wherein said two relatively rotatable components comprise the housing and input shaft portions of a hydraulic pump assembly.

8. The combination of claim 7, wherein said hydraulic pump assembly includes a closed hydraulic circuit and a variable restricted discharge control valve.

9. The combination of claim 1 wherein said slug assembly further includes a piston assembly for slidably engaging the interior wall surfaces of a pipeline so as to be propelled through the pipeline in response to fluid being pumped through said pipeline and the resultant differential in fluid pressures on opposite sides of said piston assembly.

* * * * *